Oct. 27, 1931.  E. W. ZEH  1,828,828
EMERGENCY STOP FOR FRICTION SCREW PRESSES
Filed Oct. 21, 1930
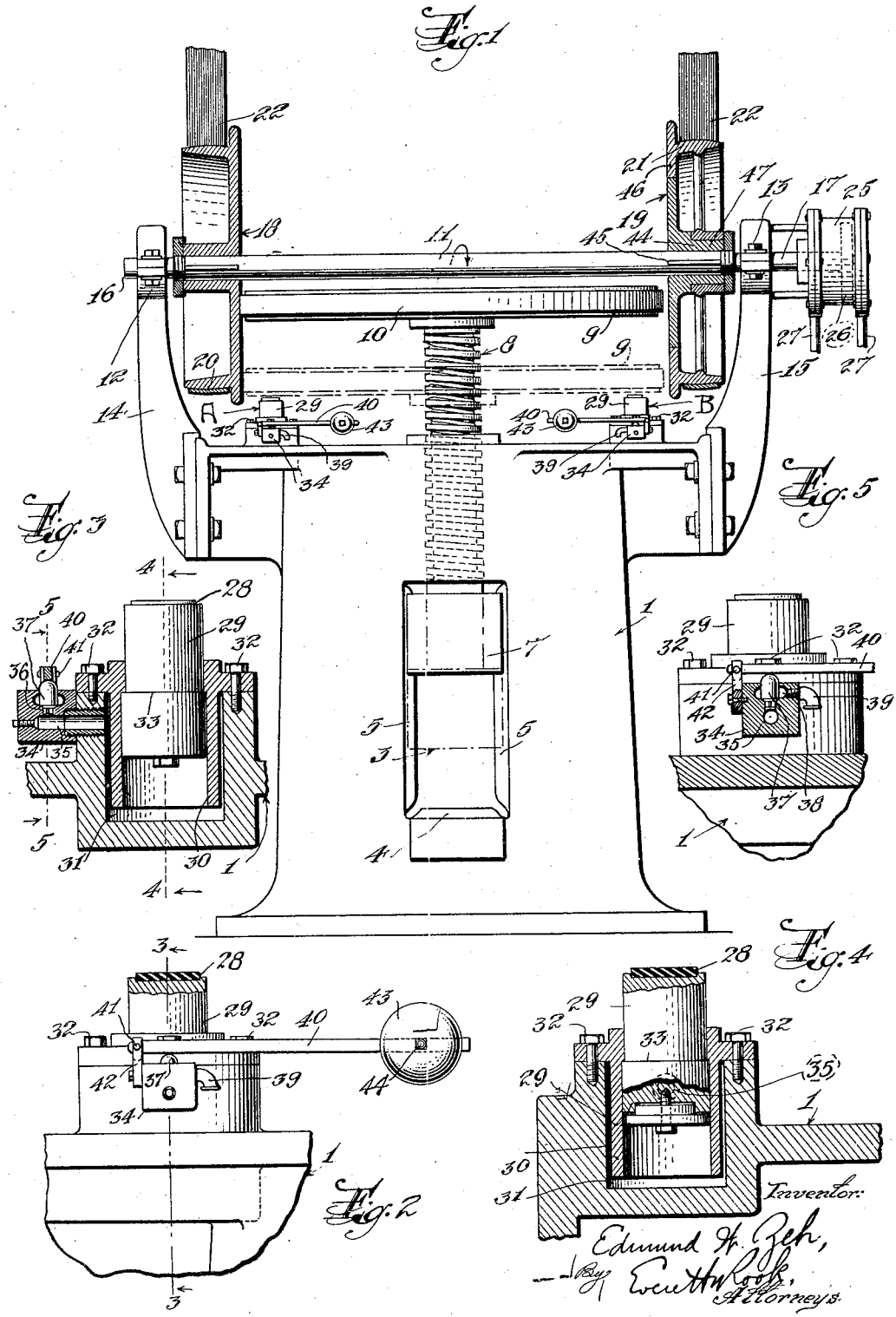

Patented Oct. 27, 1931

1,828,828

UNITED STATES PATENT OFFICE

EDMUND W. ZEH, OF NEWARK, NEW JERSEY

EMERGENCY STOP FOR FRICTION SCREW PRESSES

Application filed October 21, 1930. Serial No. 490,182.

This invention relates in general to that type of power press shown in Patent No. 1,151,845 dated August 31, 1915, in which a head for carrying one die is moved toward and away from a bed that supports a fixed die, by a screw which is mounted in the press frame and alternately rotated in opposite directions by alternate engagement of a pair of friction discs with opposite sides of the periphery of a friction wheel carried by the screw.

In this type of press the friction wheel is rigidly secured to the screw and the dies are removable. The travel of the screw and friction wheel on the working stroke is usually stopped by engagement of the movable die with the other die or the work, but should the operator inadvertently start the press without a die or a substitute therefor in place, the friction wheel may be accidentally forced against the frame during excessive or overthrow movement of the wheel so as to cause breaking or fracturing of the screw, the friction wheel or the frame, or other damage to the press or serious injury to the operator, unless some means is provided for preventing it. The problem of preventing this excessive movement of the friction wheel is especially important where the press has a large capacity, for example, where the friction wheel moves toward the bed with great accumulated energy of say 100,000 foot pounds. In such large presses as are now made, the friction wheels are ten feet, more or less, in diameter and rotate at a speed of approximately twenty-five miles per hour; and movement of the friction wheels at their highest speed must be completely stopped during linear travel of only a few inches, so that enormous and at the same time gradually yielding, braking resistance must be provided to stop the friction wheel.

An emergency stop or check of the general character described for smaller presses, is disclosed in my Patent No. 1,199,854 dated October 3, 1916, but it is practically impossible to use such a spring emergency stop in unusually large capacity presses because of the impracticable size and prohibitive cost of such a device which would be required for that purpose.

Accordingly, one object of the invention is to provide an emergency stop for large capacity friction screw power presses which shall embody novel and improved features of construction whereby the device shall be capable of stopping such excessive movement of the friction wheel, and at the same time shall be relatively small, compact, and comprised of a few simple parts.

Other objects are to provide an emergency stop of the character described wherein fluid pressure is utilized as the braking medium so that a maximum of resistance or braking power upon the friction wheel shall be obtained with a minimum number of small, simple and durable parts; to provide such a device which shall be reliable and positive in operation; to provide a novel and improved hydraulic emergency stop for friction screw power presses, and to obtain other advantages and results as will be brought out by the following description.

Referring to the accompanying drawings in which corresponding and like parts are designated by the same reference characters throughout the several views, Figure 1 is a front elevation of a friction screw press showing a brake mechanism embodying my invention applied thereto.

Figure 2 is an enlarged front elevation of one of the brake devices.

Figure 3 is a transverse vertical sectional view on the line 3—3 of Figure 2.

Figure 4 is a transverse vertical sectional view on the line 4—4 of Figure 3, and Figure 5 is a transverse vertical sectional view on the line 5—5 of Figure 3.

Specifically describing the embodiment of the invention illustrated in the drawings, the numeral 1 designates the frame of the press which is provided with an elongated vertically disposed opening 3 extending transversely through the frame at its longitudinal center, said opening being formed at the lower end thereof with a bed 4 adapted to receive a fixed die (not shown). The sides of the opening 3 are provided with vertical guides 5 upon and between which is mounted a vertically slidable head 7 adapted to carry another die (not shown) to cooperate with the fixed die. This head 7 is carried by the lower end of a vertical screw 8 which has a suitable swivel connection with the head and extends upwardly through the top of the frame 1, the upper end thereof being provided with a horizontally disposed wheel 9 having a friction surface 10 on its periphery It is obvious, therefore, that rotation of the screw alternately in opposite directions will cause the head 7 to be moved up and down on the guides 5.

Arranged above the friction wheel 9 and diametrically thereof is a horizontally disposed drive shaft 11 journaled in bearings 12 and 13 at the upper ends of upstanding brackets 14 and 15 secured to opposite sides of the frame 1. The bearings 12 and 13 are preferably anti-friction, and the shaft 11 is both rotatable and slidable therein, the ends of the shaft projecting outwardly beyond the bearings, as indicated at 16 and 17. Mounted on the shaft 11 at diametrically opposite points on the edge of the friction wheel 9 is a pair of friction drive members, such as discs 18 and 19, adapted to alternately engage the friction surface 10 of the wheel 9 to rotate the screw 8.

Any suitable means may be utilized for driving the discs 18 and 19, but as shown I provide pulley surfaces 20 and 21 on the outer sides of said discs and connect said pulley surfaces by belts 22 to any suitable source of power. Assuming the shaft 11 to be rotating in the direction of the arrows on Figure 1, it will be obvious as the friction disc 18 engages the wheel 9, the head 7 will be forced downwardly, while engagement of the disc 19 with the wheel 9 will move the head upwardly. To accomplish the alternate engagement of the friction discs 18 and 19 with the friction wheel 9 the shaft 11 is slidable in its bearings. For the purpose of longitudinally sliding the shaft 11 any suitable mechanism may be utilized, for example, the mechanism described in my Patent No. 1,324,095, dated December 9, 1919, or I may use a fluid pressure device comprising a cylinder 25 secured to the frame of the press and within which is reciprocable a piston 26 connected to the shaft 11. Fluid pressure may be alternately supplied to and vented from opposite sides of the piston 26 through pipes 27 by any suitable valve device (not shown).

The drive disc 19 comprises a central body portion 44 keyed at 45 on the shaft 11 and surrounded by coaxial annular rim section 46 which is rotatable upon the hub portion 47 of the central portion 44. The rim section 46 has connected therewith the pulley surface 21.

With this construction it will be observed that the central section 44 of the drive disc 19 is rotated at the same speed as the drive disc 18, while the annular rim section 46 of the drive disc 19 is rotated at a lower speed. Therefore, the friction wheel 9 and screw 8 are actuated on their down-stroke with gradually increasing speed, as in the construction shown in Figure 1. The initial movement of the friction wheel on the return stroke is effected by the annular rim 46 rotating at a lower speed. As the friction wheel rises it passes from the rim section 46 into contact with the outer portion of the central section 44 where the speed of the wheel is increased and then gradually decreased as the point of contact of the friction wheel with the central section 44 approaches the center of the latter. It will be observed that the friction surfaces of the two sections 44 and 46 are in the same plane transversely to the axis of the shaft 11, and only enough clearance is provided between the edge of the central section and the inner periphery of the rim section to permit relative rotation of the sections. This drive mechainsm is described and claimed in my Patent No. 1,810,996 issued June 23, 1931.

From the foregoing it will be observed that the friction wheel 9 moves downwardly toward the bed at great and gradually increasing speed, and in a large press has such tremendous accumulated energy, that if the wheel should be permitted to strike the frame 1 of the press, due, for example, to the absence of a die on the bed, serious damage might result. As above stated, the purpose of the invention is to prevent such an occurrence by the use of a fluid emergency stop for the friction wheel. Preferably there are two stops A and B used at diametrically opposite points on the top of the frame beneath the rim of the friction wheel 9, in the path of movement thereof beyond the limit of its normal stroke, and as these stops are identical in construction, we shall describe only one. The stop comprises a brake head 28 on the end of a plunger 29 reciprocable in a vertical cylinder 30 secured in a cupped recess 31 in the top of the press frame 1, as by bolts 32. The cupped recess 31 and the cylinder 30 are normally filled with a fluid, preferably oil, under sufficient pressure to hold the plunger 29 at the upper end of the cylinder, as shown in Figure 3 of the drawings. The plunger is formed with a shoulder 33 to limit movement of the plunger outwardly of the cylinder.

At one side of the recess 31 is arranged a valve casing 34 which communicates with the recess 31 and cylinder 30 by a horizontal lateral passage 35. This passage 35 has an upwardly directed valve port 36 with which cooperates a valve head 37 which controls communication between the passage 35 and an outlet passage 38 in the valve casing which communicates with the atmosphere through an elbow or the like 39. The valve head 37 is normally held against its seat to close the port 36, by a lever 40 which is pivotally connected at one end as at 41 to a bracket 42 on the valve casing to swing in a vertical plane and has at its free end a counterweight 43 adjustable longitudinally of the lever in the usual manner, as by a set screw 48.

In operation of the emergency stop device, the counterweights 43 are adjusted on the respective levers 40 so that the valves 35 will open at a predetermined pressure which will vary in accordance with the power to be resisted in the friction wheel 9 during the braking operation. Should the friction wheel 9 descend beyond its normal operating lower limit for any reason, it will strike the brake heads 28 and force the plungers downwardly, as shown by dot and dash lines in Figure 1. This action tends to force the liquid out of the cylinders through the valve ports 36, and when the pressure on the plungers overbalances the resistance to opening of the valves produced by the counterweights 43, the levers 40 are raised and the valves 37 open to permit some of the liquid to escape through the outlets 38, 39. The plungers 29 thus resist downward movement of the friction wheel with a substantially uniform yielding force, until the movement of the friction wheel is stopped, whereupon the valves 37 are closed by the counterweights 43. To free the friction wheel from the brake heads for the return stroke the operator should first raise the levers 40 to release the valves 37 so as to relieve the pressure and consequently reduce the friction between the friction wheel and the brake heads.

It will be understood that this occurrence is infrequent and due to unusual causes, and while it might be desirable to provide automatic means for immediately replenishing the liquid in the cylinders 30, it is usually satisfactory to manually refill the cylinders after a braking operation has occurred.

While I have shown and described the invention as embodied in certain details of construction it will be understood that this is primarily for the purpose of illustrating the principles of the invention and that many modifications and changes may be made in the details of construction without departing from the spirit or scope of the invention.

Having thus described my invention, what I claim is:

1. In a press, a frame, a screw mounted in said frame, a friction wheel on said screw, drive discs to engage the edge of said friction wheel, and an emergency stop for said friction wheel comprising a brake head movably mounted on said frame in the path of movement of said friction wheel so as to be engaged thereby when said friction wheel passes beyond the limit of its normal stroke, and fluid means connected to said brake head to yieldingly resist movement of said brake head when the latter is engaged by said friction wheel so as to stop movement of said friction wheel.

2. In a press, a frame, a screw mounted in said frame, a friction wheel on said screw, drive discs to engage the edge of said friction wheel, and an emergency stop for said friction wheel comprising a cylinder on said frame containing a fluid and having an outlet, a plunger in said cylinder with one end extending therebeyond into the path of movement of said friction wheel so as to be engaged by said friction wheel when the latter passes beyond the limit of its normal stroke, an outwardly opening valve in said outlet, and yielding means for resisting the opening of said valve under pressure caused by displacement of said fluid by said plunger in said cylinder when said plunger is engaged by said friction wheel.

3. In a power press, the combination with a frame, a screw mounted in said frame, a head on one end of said screw and a friction wheel on the other, friction drive members at opposite points on the edge of said friction wheel for rotating the latter, and means for rotating said drive members, of an emergency stop for said friction wheel comprising a cylinder on said frame containing a fluid and having an outlet, a plunger in said cylinder with one end extending therebeyond into the path of movement of said friction wheel so as to be engaged by the latter, and means for regulating the flow of fluid from said outlet under pressure produced by displacement of said fluid by said plunger when said plunger is engaged by said friction wheel, so as to gradually stop movement of said friction wheel.

EDMUND W. ZEH.